US008739288B2

(12) United States Patent
Diamant et al.

(10) Patent No.: US 8,739,288 B2
(45) Date of Patent: May 27, 2014

(54) AUTOMATIC DETECTION OF VULNERABILITY EXPLOITS

(75) Inventors: John R. Diamant, Fort Collins, CO (US); Wan-Yen Hsu, Cupertino, CA (US); David Hsing Lin, Santa Clara, CA (US); Eric C. Scoredos, Boulder Creek, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1710 days.

(21) Appl. No.: 11/888,772

(22) Filed: Jul. 31, 2007

(65) Prior Publication Data
US 2009/0038015 A1 Feb. 5, 2009

(51) Int. Cl.
*H04L 29/06* (2006.01)
(52) U.S. Cl.
USPC .................................. 726/25; 726/22

(58) Field of Classification Search
USPC ........... 726/22, 23, 24, 25; 717/168, 172, 173
See application file for complete search history.

(56) References Cited

U.S. PATENT DOCUMENTS

| | | | |
|---|---|---|---|
| 6,493,871 B1* | 12/2002 | McGuire et al. | 717/173 |
| 2004/0093514 A1* | 5/2004 | Piazza et al. | 713/201 |
| 2004/0260945 A1 | 12/2004 | Raikar et al. | |
| 2005/0015760 A1* | 1/2005 | Ivanov et al. | 717/168 |
| 2005/0246776 A1* | 11/2005 | Chawro et al. | 726/23 |
| 2006/0123481 A1* | 6/2006 | Bhatnagar et al. | 726/24 |
| 2006/0248082 A1 | 11/2006 | Raikar et al. | |
| 2007/0044153 A1* | 2/2007 | Schuba et al. | 726/24 |

* cited by examiner

Primary Examiner — Edward Zee

(57) ABSTRACT

An embodiment of the invention provides an apparatus and method for automatic detection of a vulnerability exploit. The apparatus and method are configured to post a security vulnerability warning indicating a vulnerability of software; provide an exploit detector; and use the exploit detector to detect an attempted exploit that targets the vulnerability.

21 Claims, 3 Drawing Sheets

AUTOMATIC DETECTION OF VULNERABILITY EXPLOITS

TECHNICAL FIELD

Embodiments of the invention relate generally to the automatic detection of vulnerability exploits.

BACKGROUND

Vulnerabilities have been found in various types of software such as, for example, operating systems and software applications. The term "vulnerability" refers to a security defect in a system or software so that an attacker can potentially violate the confidentiality, integrity, operations, availability, access control, and/or data of the system or software. Vulnerabilities may result from bugs or design flaws in the system or software.

Security bulletins are issued by software vendors and security fixes (e.g., software patches which are updates to software) are typically applied to software, as a response to a discovered vulnerability in software. For example, Microsoft Corporation provides software updates or security patches in, for example, WINDOWS® update. However, applying a security fix to a system (e.g., server) may require downtime and re-booting of the system and may disrupt or make unavailable the services provided by the system. This disruption or system unavailability can lead to added cost for the user of the system.

System administrators often bundle the security fixes together that they download/receive, and may apply these bundled fixes on a pre-scheduled cycle in order to reduce the time that they spend in applying the fixes. However, some security fixes may be required to apply to the system before the pre-scheduled cycle, particularly if the discovered software vulnerability has a high severity (e.g., there is a high likelihood that exploits will occur on the vulnerability and/or the damage that an exploit can cause is high).

Security bulletins are placed by software vendors in customer-accessible databases and provide additional details that describe, for example, a discovered software vulnerability, the severity and urgency of the problem (e.g., if the vulnerability requires a critical update), likelihood of an exploit and the spread of the exploit, the potential damage that a vulnerability exploit can cause to the system or software, instructions on the security fixes (e.g., patches), and/or the like. However, the posting of security bulletins also potentially provides information to potential hackers on how to exploit the discovered vulnerability. Additionally, an administrator (or user) may not necessarily apply a security fix to a system, immediately or at all, because the administrator may need to first test the security fix for potential harm to the system and/or applying the security fix will cause downtime or disruption to the system.

In a highly-used or highly-available system (e.g., servers that are used or accessed by many computers), the cost of having the system as unavailable can be high. As a result, an administrator may wait for a certain period of time before applying the security fix to the system in order to delay the downtime or to schedule the downtime when few users are accessing the system. Furthermore, in other network systems, a network administrator would push the security fix downstream to individual users of computers, and these individual users may not necessarily apply the fixes or may delay in applying the fixes to their individual computers. Additionally, some administrators or users might delay in applying the security fix if the system is protected by a firewall.

As a result, the above constraints (and other possible constraints) may prevent administrators (and/or users) in applying the security fixes, immediately or at all. The administrators are making their decisions on when to apply the fixes based on the relative risks of quickly applying the fixes versus the relative risks of delaying in applying the fixes. In other words, the administrators are weighing the cost of immediately applying the fixes (which leads to costs/expenses associated with, e.g., system downtime) versus the cost of potential damage to the system if the vulnerability is exploited by a hacker. The decision of administrators to delay in applying the security fix takes into account the expected severity of vulnerability exploit damage and the probability of an exploit occurrence.

There is a need to solve the problem of protecting a system from vulnerability exploits, between the time when a vendor posts a security bulletin for a discovered vulnerability and the time when a security fix for the discovered vulnerability is actually applied to the system.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
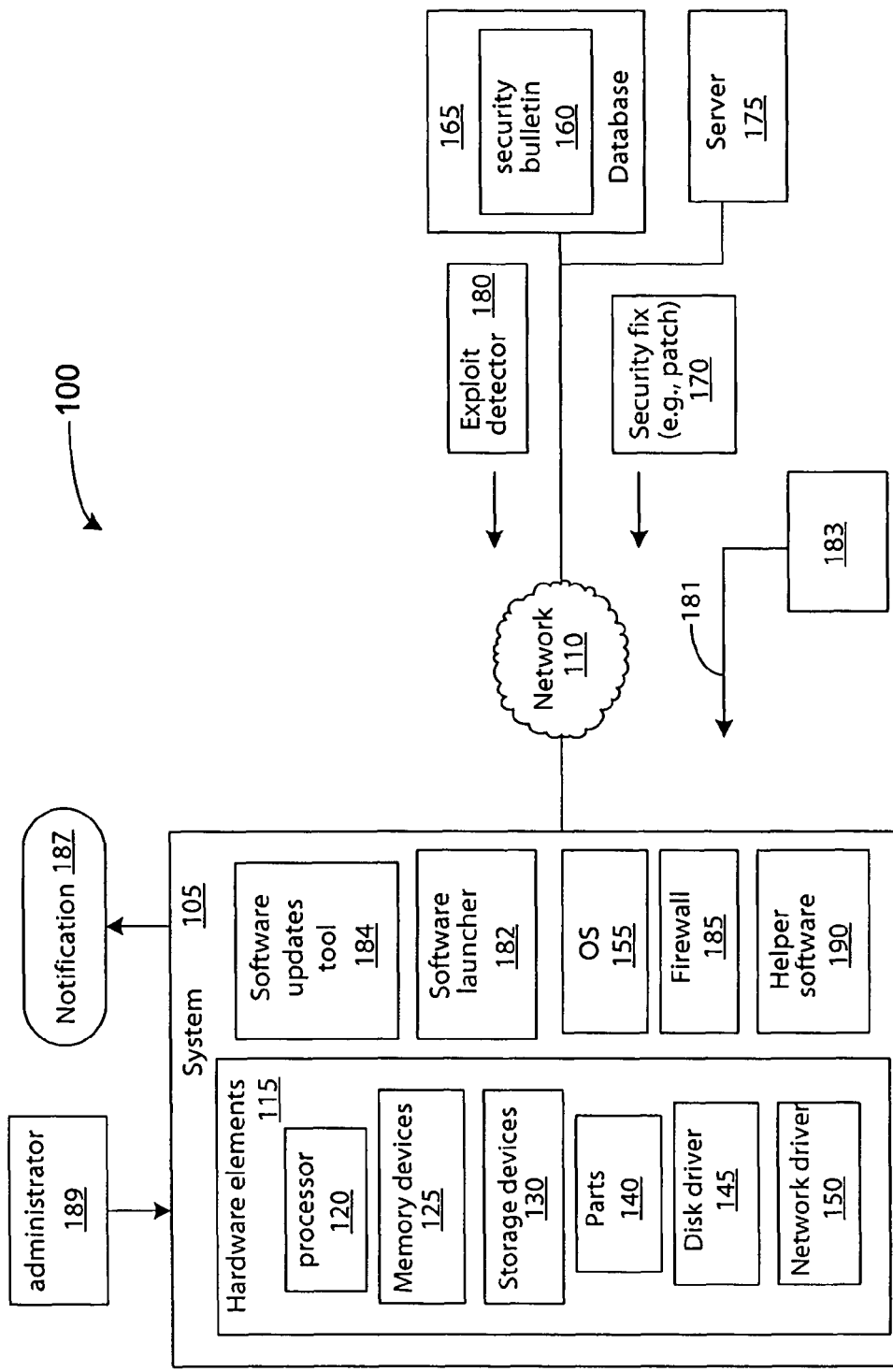
FIG. 1 is a block diagram of an apparatus (system) in accordance with an embodiment of the invention.

FIG. 1 is a block diagram of an apparatus (system) 100 in accordance with an embodiment of the invention. A system 105 is connected to a network 110. The system 105 can be, for example, a server or a computer. The network 110 is, for example, a public network such as a wide area network (e.g., Internet).

The system 105 includes standard hardware elements 115 that are used in computing operations or data transmissions. For example, the hardware elements 115 includes a processor 120, one or more memory devices 125, storage devices 130 such as disks, ports 140, a disk driver 145, a network driver 150, and/or other known hardware elements that are used in computing devices.

The system 105 also includes software elements such as, for example, an operating system 155 that performs management functions and other functions that are known to those skilled in the art.

As previously discussed above in the background section, a software vendor will post a security bulletin 160 after a vulnerability is discovered in a software or system that is provided by the vendor to customers. The security bulletin 160 is typically posted in a publicly-accessible database 165 or email list. A particular security bulletin 160 may provide additional details that describe, for example, a discovered software vulnerability, the severity and urgency of the problem (e.g., if the vulnerability requires a critical update), likelihood of an exploit and the spread of the exploit, the potential damage that a vulnerability exploit can cause to the system or software, instructions on the security fixes (e.g., patches), and/or the like.

The vendor can provide a security fix 170 from a server 175. Typically, the security fix 170 can be downloaded by the customer from the server 175 to the system 105 via network 110. The security fix 170 can be, for example, a software patch or software update, and is designed to protect software in the system 105 from exploits that are designed to attack the vulnerability that is posted in the security bulletin 160. The administrator of server 105 can install the security fix 170 to the system 105 in order to protect the system 105 from exploits that are designed to attack the vulnerability that has been posted in the security bulletin 160. Various security fixes that protect particular software (e.g., operating systems software) from discovered vulnerabilities of the particular software are well known to those skilled in the art.

In an embodiment of the invention, an exploit detector 180 is transmitted along with the security fix 170 from a source node (e.g., server 175) to a destination node (e.g., system 105). In other instances, the exploit detector 180 can be transmitted immediately after (or subsequently after) the security fix 170 is transmitted from the source node to the destination node.

After the exploit detector 180 is installed into the system 105 and launched by a standard software launcher 182, the exploit detector 180 can detect a current exploit (or attempted exploit) 181 that is attacking a vulnerability in the system 105. As mentioned above, this vulnerability was posted in the security bulletin 160. An exploit 181 can be generated typically by a hacker who may be operating a node 183 (e.g., server) and this hacker may be aware of the vulnerability that is posted in the security bulletin 160. It is possible that the hacker may alternatively design (reverse-engineer) an exploit 181 from the security fix 170 that is designed to attack the vulnerability that has been posted in the security bulletin 160.

The exploit detector 180 is code that can be programmed by use of standard programming languages (e.g., C, C++, shell script, or Pascal) and can be programmed by use of standard programming techniques that are known to those skilled in the art.

The exploit detector 180 can be customized by the vendor's personnel who understand the security fix 170 and the particular vulnerability that is disclosed in the security bulletin 160. The exploit detector 180 can detect the particular vulnerability exploits 181 that are disclosed in the security bulletin 160. The administrator can install the exploit detector 180 (manually or automatically via a tool) into the system 105 if the administrator has not yet been able to apply the security fix 170 to the system 105 due to the constraints that have been discussed above in the background section. The exploit detector 180 automatically detects an exploit 181 (or an occurrence of a previous exploit 181 or attempted exploit) that attacks the particular vulnerability that is identified in the posted security bulletin 160. The administrator of system 105 is aware that the system 105 is vulnerable (or/and software in the system 105 is vulnerable) to the particular exploit 181 that is disclosed by the security bulletin 160, because he/she has not yet applied the security fix 170 that is designed to protect the system 105 from the exploit 181.

A standard software launcher 182 can start the execution of the exploit detector 180 and may also be used to disable or delete the exploit detector 180 after the administrator has installed the security fix 170 on the system 105. Software launchers are used in commercially available computers and are implemented in various forms.

As an example operation, assume that the security bulletin 160 posts a security vulnerability that has been discovered by a vendor of software that is installed in the system 105. For example, the security bulletin 160 discloses a vulnerability for the operating software 155. A standard software updates tool 184 can notify the administrator of the system 105 about the posted security bulletin 160 and the availability of a security fix 170 for the vulnerability. Software updates tools are provided in various commercially-available operating systems such as, for example, HP-UX® from HEWLETT-PACKARD COMPANY or WINDOWS® from MICROSOFT CORPORATION. As a further example, if the security bulletin 160 indicates that the operating system 155 has the vulnerability of being exploited by spyware or spamware, then the security fix 170 can protect the operating system from spyware or spamware. Methods for protecting software programs from particular vulnerabilities (e.g., spyware or spamware attacks) are known to those skilled in the art. For example, the exploit detector 180 can monitor for system state changes (in system 105 or in the software itself) or network patterns from network 110, by use of a standard host-based firewall pattern analyzer in the firewall 185 or Host-based Intrusion Detection System (such as, e.g., HP-UX HostIDS). Therefore, block 185 can additionally or alternatively include the features of a commercially-available host based Intrusion Detection System.

As an example, the HostIDS product can limit access to the system 105 if the detector 180 detects an attack. The required security fix 170 (e.g., patch) would then be installed. As other examples, it is also within the scope of embodiments of the invention for automatic, recommended, or computer assisted actions that are well known to those skilled in the art to, for example: install the security fix 170, disable the system 105 or shut the system down, take the system 105 off the network, add firewall rules (e.g., so that the firewall restricts the system's network access), use HostIDS intervention to limit access to the system by use of methods that are known to those skilled in the art, and/or isolate the system 105 in other ways that are known to those skilled in the art, when the detector 180 detects an attack.

The exploit detector 180 may also include code that generates a notification 187 that an administrator 189 can view via, for example, a user interface in the system 105. The notification 187 can indicate that an exploit 181 is occurring or has occurred. The administrator can then perform an appropriate response if an exploit is occurring or has occurred, such as, for example, installing the security fix 170 immediately and without further delay.

Those skilled in the art can use known methods to program an exploit detector 180 to detect an exploit (e.g., spyware or spamware attack) that is attacking the operating system 155 or that may have infected the operating system 155, and to program the exploit detector 180 to generate the notification 187. The implementation details of programming code (such as the exploit detector 180) to detect a known exploit (e.g., spyware or spamware attack or other types of attacks) are known to those skilled in the art and can differ depending on the type of attack.

Figure 2:
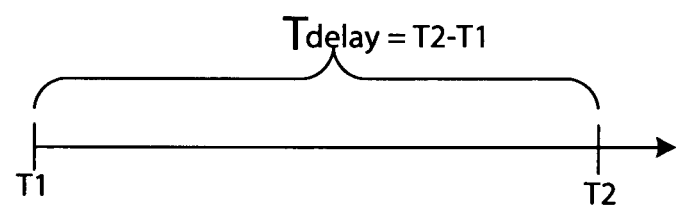
FIG. 2 is a block diagram illustrating a timeline from the posting of a security bulletin to the application of a security fix.

Since the security bulletin 160 has been publicly posted at time T1 (FIG. 2), a potential hacker can develop (reverse-engineer) and release an exploit 181 that can attack the vulnerability that is noted in the security bulletin 160. As discussed above, various constraints may prevent an administrator in applying the security fix 170 that protects against the exploit 181, until at subsequent time T2. Therefore, there is a delay interval, $T_{delay}=T2-T1$, where the security bulletin has been publicly posted and the system 105 does not yet have the security fix 170 installed and is therefore vulnerable to the particular exploit 181 that has been posted in the security bulleting 160. The delay interval, $T_{delay}$, can have a value in minutes, hours, days, weeks, or months, depending on the time length that the administrator delays in applying the security fix 170 due to various example constraints that have been discussed above. As also discussed above, it is a common practice by administrators to apply software fixes on a scheduled cycle which can be, for example, every few weeks or months.

Vendors typically recommend that the security fix should be applied by their customers as soon as possible after the security bulletin is posted at time T1. However, as discussed above, due to various constraints, administrators or users may delay or not even apply the security fix after the time T1 or at all, particularly if the system is a high-availability system or if the system is protected by a firewall. The exploit detector 180 helps to reduce the risk when the administrator delays in applying the security fix 170 and also informs the administrator when an actual attack occurs with relation to the vulnerability. With this solution, systems can be protected completely from some attacks, if the exploit detector 180 is designed to block the particular attack 181 or if the administrator can react quickly enough to block an attack by, for example, adjusting the firewall rules of a firewall to protect against the attack 181.

At a minimum, the exploit detector 180 can detect the occurrence of an attack 181 before the security fix 170 is applied to the system 105 at time T2. Since the administrator is notified by the exploit detector 180 that an attack 181 occurred before time T2, the administrator can perform corrective action to fix the damages from the attack 181 and take protective action such as, e.g., immediately installing the security fix 170 to the system 105. For example, if the exploit detector 180 detects a spyware or spamware that has infected the operating system 155 due to an attack 181 during the delay interval $T_{delay}$, then the administrator can use anti-spyware software or anti-spamware software to remove the spyware or spamware that has infected the operating system 155, and apply the security fix 170 to prevent future exploits 181 to the operating system 155, or reinstall the operating system and application software from a known uncompromised source. Therefore, the exploit detector 180 can provide at least partial protection from an attack 181 that can occur before the system 105 is brought down for updates during time T2.

As mentioned above, the exploit detector 180 can be configured to monitor for system state changes or network patterns using a host-based firewall pattern analyzer (in this case, the detector might modify a firewall 185 rule and set up a notification 187). Since the firewall rule is modified, the firewall 185 could automatically respond by blocking or slowing down access of network traffic to particular ports 140.

As discussed above, an embodiment of the invention allows administrators, who may have reason to delay in applying fixes 170 for security bulletins 160 (such as until time T2 which starts a maintenance window), to detect actual exploits 181 of the vulnerability by use of the detectors 180 that can be installed in the system 105. These detectors 180 would allow the administrators to know when waiting for a maintenance window is too risky even after they previously made that decision to delay the installation of a security fix 170 until time T2.

If the exploit detector 180 has detected an occurring exploit 181 or has detected an exploit 181 that had already occurred in the system 105, then the administrator can optionally take corrective action or protective action to respond to the occurring exploit or previous exploit. For example, the administrator can immediately apply the security fix 170 or other software application for fixing any damages that may have been caused by an exploit 181.

If the exploit detector 180 detects frequent attacks, then the administrator can shorten the delay interval $T_{delay}$ by applying the security fix 170 sooner rather than later, as a future procedure for the system 105.

Embodiments of the invention provide various advantages. For example, the approach discussed above allows systems to maintain up-time and avoid the risk of system breakage due to the installation of security fixes which may break the system or cause unexpected harm in the system, while allowing the system to monitor and detect attempted exploits 181 of the security defects which remain temporarily unpatched on the system. As also discussed above, system up-time requirements and testing intervals (for security fixes) often delay administrators from immediately installing the security fixes. This delay leaves systems vulnerable to attack. By installing the exploit detector 180 which can specifically detect the particular vulnerability that is posted in a particular security bulletin 160, the administrator 189 has at least some assurance of notification if their system is attacked by a known exploit 181 and if their system has not yet been installed with the security fix 170 for that exploit 181. In a best case scenario, the exploit can be stopped by the detector 180, the host-based firewall 185, or helper software 190 (e.g., anti-spamware or anti-spyware software) that can be installed by the administrator. In the lesser case scenario, the administrator is at least notified by the exploit detector 180 that he or she has waited too long to apply the security fix 170 because an exploit 181 has occurred during the delay interval $T_{delay}$, and the administrator can take corrective action to fix the damage that has been caused by the exploit 181.

Note further that intrusion detection systems differ from embodiments of the invention because intrusion detection systems are designed for monitoring a wide range of suspicious network traffic and are not designed to monitor a specific exploit that is specifically disclosed by the security bulletin 160 and that is to be prevented by the security fix 170. Additionally, an intrusion detection system is not tied directly to a security fix 170 (e.g., patch) because the use of an intrusion detection system is completely independent from the developments of security fixes development and is completely independent from vulnerability announcements in security bulletins 160.

Note further that intrusion prevention systems differ from embodiments of the invention because intrusion prevention systems are also not designed to respond to a specific exploit that is specifically disclosed by the security bulletin and that is to be prevented by the security fix. While this invention could be implemented as extensions to Intrusion Detection or Prevention Systems, doing so would go beyond the current state of the art in the field.

Figure 3:
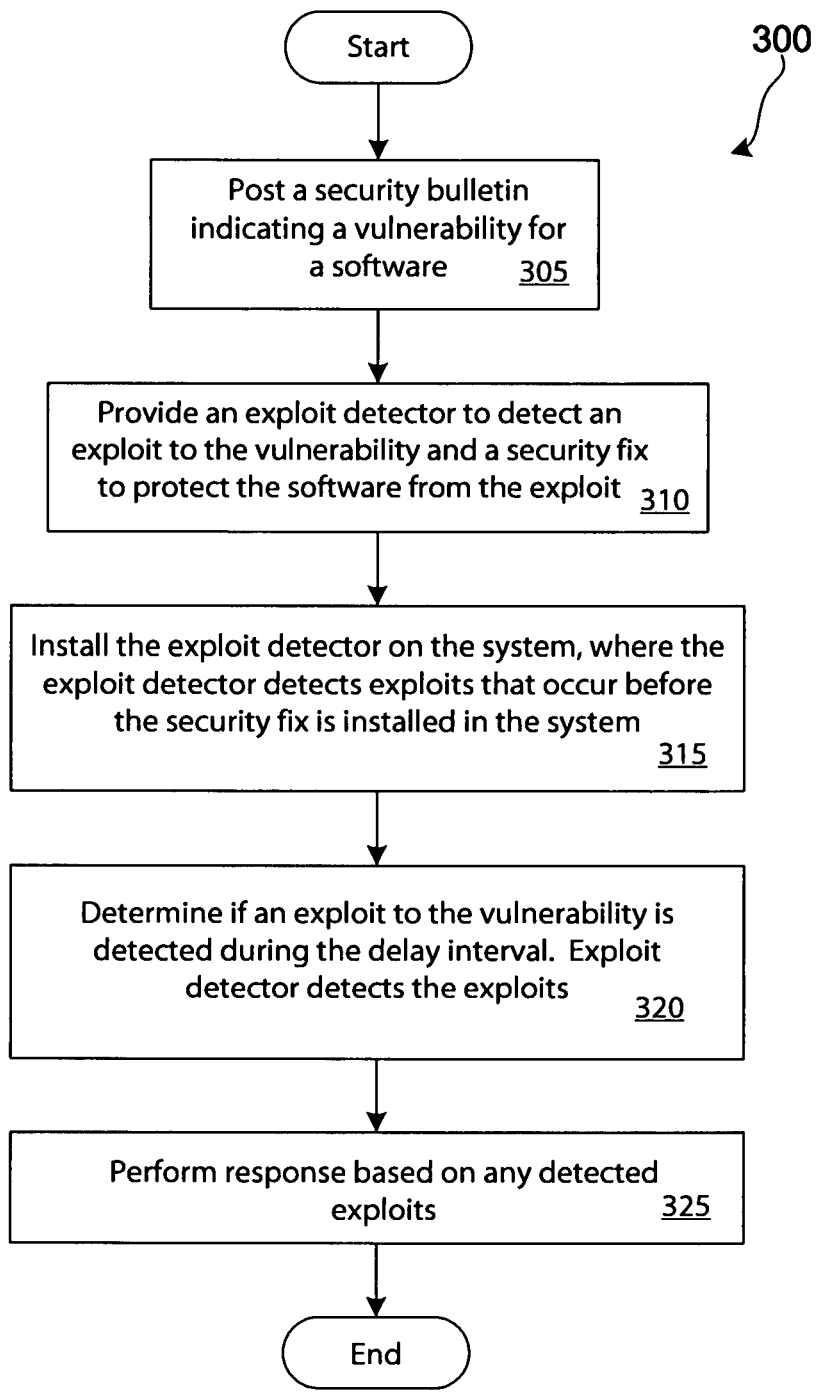
FIG. 3 is a flow diagram of a method in accordance with an embodiment of the invention.

FIG. 3 is a flow diagram of a method 300 in accordance with an embodiment of the invention. In block 305, the vendor of software can post a security bulletin (or other types of security vulnerability warning) indicating a vulnerability for the software or system that has been installed with the software.

In block 310, the vendor can provide an exploit detector to detect an exploit to the vulnerability and a security fix to protect the software from the exploit. The user of the system with the software can then download the exploit detector and the security fix.

Blocks 305 and 310 are shown as separate blocks in FIG. 3, and may vary in order or may concurrently occur. Typically, the exploit detector is included with the posting of the security bulletin, or the exploit detector may be available for use before or after the vulnerability is publicized.

In block 315, the user can install the exploit detector on the system, where the exploit detector detects exploits that occur before the user can install the security fix on the system. As discussed above, there may be one or more constraints that prevent the user to immediately install the security fix on the system.

In block 320, the exploit detector detects any exploits to the vulnerability. Therefore, the exploit detector permits the user of the system to determine if an exploit to the vulnerability is detected prior to installation of the security fix on the system.

In block 325, the user can optionally perform a response (or have the system automatically perform a response), as discussed above, based on any detected exploits to the vulnerability. For example, the user (or system) can immediately install the security fix 170 to the system or/and disable or isolate the system 105, if an exploit has been detected by the exploit detector or/and if an exploit is being detected by the exploit detector.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for automatic detection of a vulnerability exploit, the method comprising:
   publicly posting a security vulnerability warning indicating a vulnerability of software;
   providing, executed by a computer processor, an exploit detector configured for automatically detecting an attempted exploit that targets the vulnerability;
   transmitting the exploit detector to a destination node for installation, the destination node comprising the software;
   automatically detecting the attempted exploit that targets the vulnerability using the exploit detector prior to installing a patch for correcting said software such that said software is protected against the vulnerability, the automatically detecting occurring at the destination node;
   in response to said exploit detector detecting said attempted exploit, providing a response to the attempted exploit, wherein said response comprises said installing said patch for correcting said software such that said software is protected against the vulnerability; and
   perform an additional response based on any exploits, exploit attempt, or exploit occurrence that are detected by the exploit detector by reducing a delay interval that occurs prior to installing a security fix to the destination node.

2. The method of claim 1, wherein providing the response further comprises:
   disabling a system that has been targeted by the attempted exploit.

3. The method of claim 1, wherein providing the response further comprises:
   isolating a system that has been targeted by the attempted exploit.

4. The method of claim 1, wherein providing the response further comprises:
   disconnecting a system from a network, where the system has been targeted by the attempted exploit.

5. The method of claim 1, wherein providing the response further comprises:
   adding at least one firewall rue that restricts a network access by a system that has been targeted by the attempted exploit.

6. The method of claim 1, wherein the response is automatically performed by a destination node.

7. The method of claim 1, wherein the method further comprises providing a security fix that protects the software from the vulnerability.

8. The method of claim 1, further comprising:
   downloading the exploit detector from a source node to a destination node.

9. The method of claim 1, further comprising:
   downloading a security fix from a source node to a destination node.

10. The method of claim 1, wherein the exploit detector lowers risks of damages to a system.

11. An apparatus for automatic detection of a vulnerability exploit, the apparatus comprising:
    a computer processor;
    a source node configured to publicly post a security vulnerability warning indicating a vulnerability of a software;
    an exploit detector configured to detect an attempted exploit that targets the vulnerability prior to installing a patch for correcting said software such that said software is protected against the vulnerability, wherein the exploit detector further configured for installation on a destination node;
    a transmitter configured for transmitting the exploit detector to the destination node for the installation, the destination node comprising the software;
    the exploit detector further configured for providing a response to the attempted exploit in response to said exploit detector detecting said attempted exploit, wherein the detecting is performed at the destination node and wherein said response comprises said installing said patch for correcting said software such that said software is protected against the vulnerability; and wherein if the exploit detector detects one or more of the attempted exploit, an exploit, and an exploit occurrence, then performing an additional response by reducing a delay interval that occurs prior to installing a security fix to the destination node.

12. The apparatus of claim 11, wherein the response further comprises:
   disabling a system that has been targeted by the attempted exploit.

13. The apparatus of claim 11, wherein the response further comprises:
   isolating a system that has been targeted by the attempted exploit.

14. The apparatus of claim 11, wherein the response further comprises:
   disconnecting a system from a network, where the system has been targeted by the attempted exploit.

15. The apparatus of claim 11, wherein the response further comprises:
   adding at least one firewall rule that restricts a network access by a system that has been targeted by the attempted exploit.

16. The apparatus of claim 11, wherein the response is automatically performed by a destination node.

17. The apparatus of claim 11, wherein a security fix is used to protect the software from the vulnerability.

18. The apparatus of claim 11, wherein the exploit detector is downloaded from a source node to the destination node.

19. The apparatus of claim 11, further comprising:
   wherein a security fix is downloaded from a source node to the destination node.

20. The apparatus of claim 11, wherein the exploit detector lowers risks of damages to the destination node.

21. An apparatus for automatic detection of a vulnerability exploit, the apparatus comprising:
   means for publicly posting a security vulnerability warning indicating a vulnerability of software;
   means for transmitting an exploit detector to a destination node, wherein the exploit detector is configured for detecting an attempted exploit that targets the vulnerability prior to installing a patch for correcting said software such that said software is protected against the vulnerability, wherein the exploit detector is further configured for installation on the destination node and wherein the destination node comprises the software;
   means for providing a means for detecting the attempted exploit that targets the vulnerability, wherein the detecting is performed at the destination node;
   means for providing a response to the attempted exploit in response to said exploit detector detecting said attempted exploit, wherein said response comprises said installing said patch for correcting said software such that said software is protected against the vulnerability; and
   means for performing an additional response based on any exploits, exploit attempts, or exploit occurrences that are detected by the exploit detector by reducing a delay interval that occurs prior to installing a security fix to the destination node.

\* \* \* \* \*

UNITED STATES PATENT AND TRADEMARK OFFICE
CERTIFICATE OF CORRECTION

PATENT NO. : 8,739,288 B2
APPLICATION NO. : 11/888772
DATED : May 27, 2014
INVENTOR(S) : John R. Diamant et al.

Page 1 of 1

It is certified that error appears in the above-identified patent and that said Letters Patent is hereby corrected as shown below:

In the Claims:

In column 8, line 10, in Claim 1, delete "perform" and insert -- performing --, therefor.

In column 8, line 30, in Claim 5, delete "rue" and insert -- rule --, therefor.

Signed and Sealed this
Ninth Day of September, 2014

Michelle K. Lee
*Deputy Director of the United States Patent and Trademark Office*